Figure 1:
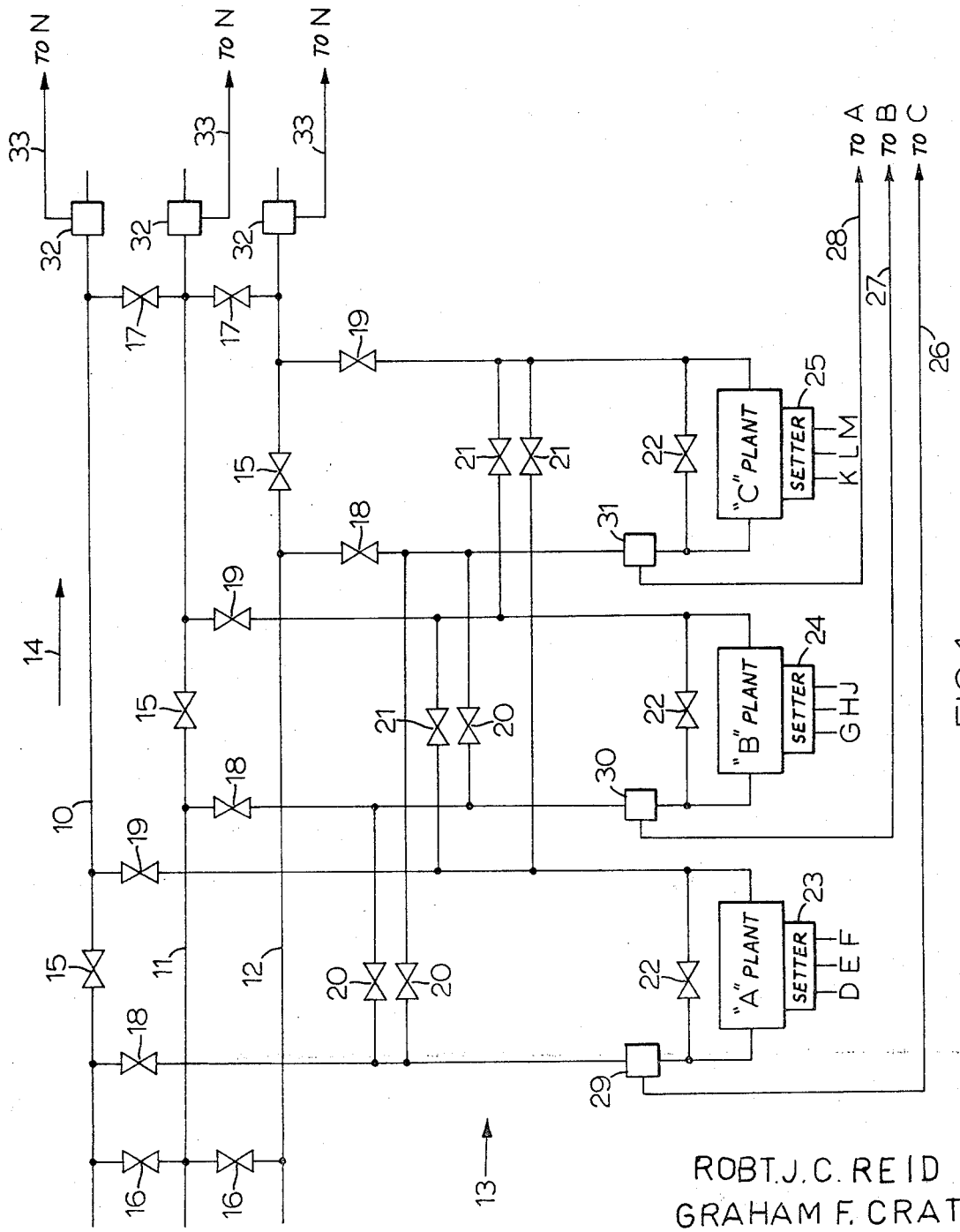

United States Patent [19]
Reid et al.

[11] 3,732,034
[45] May 8, 1973

[54] CONTROL SYSTEM FOR COMPRESSORS OPERATING IN PARALLEL

[75] Inventors: Robert J. C. Reid, Oakville; Graham F. Crate, Ottawa, Ontario, both of Canada

[73] Assignee: Trans-Canada Pipe Lines Limited, Toronto, Ontario, Canada

[22] Filed: July 21, 1971

[21] Appl. No.: 164,572

[52] U.S. Cl. ....................417/6, 318/98, 417/43
[51] Int. Cl. .................................F04b 41/06
[58] Field of Search ....................318/98–100; 417/3–6, 12, 19, 22, 43

[56] References Cited

UNITED STATES PATENTS

| | | | |
|---|---|---|---|
| 2,988,683 | 7/1961 | Pell | 318/99 |
| 3,251,534 | 5/1966 | Strecker | 417/6 |
| 3,279,377 | 10/1966 | Jacobson | 417/44 |
| 3,412,301 | 11/1968 | Mead | 318/99 |
| 3,439,622 | 4/1969 | Welty | 417/45 |

Primary Examiner—William L. Freeh
Assistant Examiner—John T. Winburn
Attorney—R. Gordon Waldie

[57] ABSTRACT

Control apparatus for controlling the operation of a compressor station comprising at least two compressor plants connected to operate in parallel, includes means providing "raise" and "lower" signals responsive to the discharge pressure of the station being lower or higher respectively than a desired discharge pressure, control means providing for each compressor plant a control signal that is responsive to the differences between the actual and desired flows of the compressor plant, control means for each compressor plant that control the plant to raise or lower the discharge pressure of the station, means that supply the "raise" or "lower" signals to the control means, and means responsive to the control signals for gating the supplying means on and off to permit or block delivery of "raise" and "lower" signals to the control means.

9 Claims, 2 Drawing Figures

ROBT. J. C. REID
GRAHAM F. CRATE
INVENTOR.

CONTROL SYSTEM FOR COMPRESSORS OPERATING IN PARALLEL

This invention relates generally to gas transmission systems, particularly natural gas transmission systems.

There are presently installed and operating in North America and elsewhere natural gas pipeline systems that serve as the means for conveying natural gas from the gas fields to consumers. As time has passed, increased demand for natural gas has led, in some cases, to the installation of one or more additional pipeline system or systems alongside an original natural gas pipeline system.

In a conventional, single pipeline, natural gas pipeline system, compressor stations are provided along the length of the pipeline about 60 miles apart from each other in some instances, and provide the pressure required to force the gas through the pipeline. Where two or more, say, three pipeline systems have been laid down side-by-side, each pipeline will have its own compressor plants, and the plants for the three pipelines also can be located close to each other in groups of three, making up what is referred to as a compressor station. Thus, in such a composite system there may be a number of compressor stations, each station consisting of three compressor plants and associated valves and pipes etc. Each compressor plant may include one or more compressors, and the compressors may be of the centrifugal type with a limited head and flow range or of the reciprocating type which a much broader headflow range of operation.

Computer studies have indicated that the best way to operate such a composite system as hereinbefore described having two or more pipelines physically located close to each other is with the pipelines connected in parallel. However, certain problems may arise when compressors, particularly of the centrifugal type, having different ratings (horsepower) are operated in parallel, and it is necessary to provide a control system to ensure that the various compressor plants take their proper share of the total load. If this is not done, one or more of the compressors may become overloaded with the consequences that result from this, while another or other compressors may take so little of the load as to approach surge operation, an operating condition which, if permitted to continue, can lead to destruction of a compressor in short order.

Thus, in accordance with this invention, there is provided a control system for controlling the share of the load taken by two or more compressor plants at any compression station of a gas transmission system.

Figure 2:
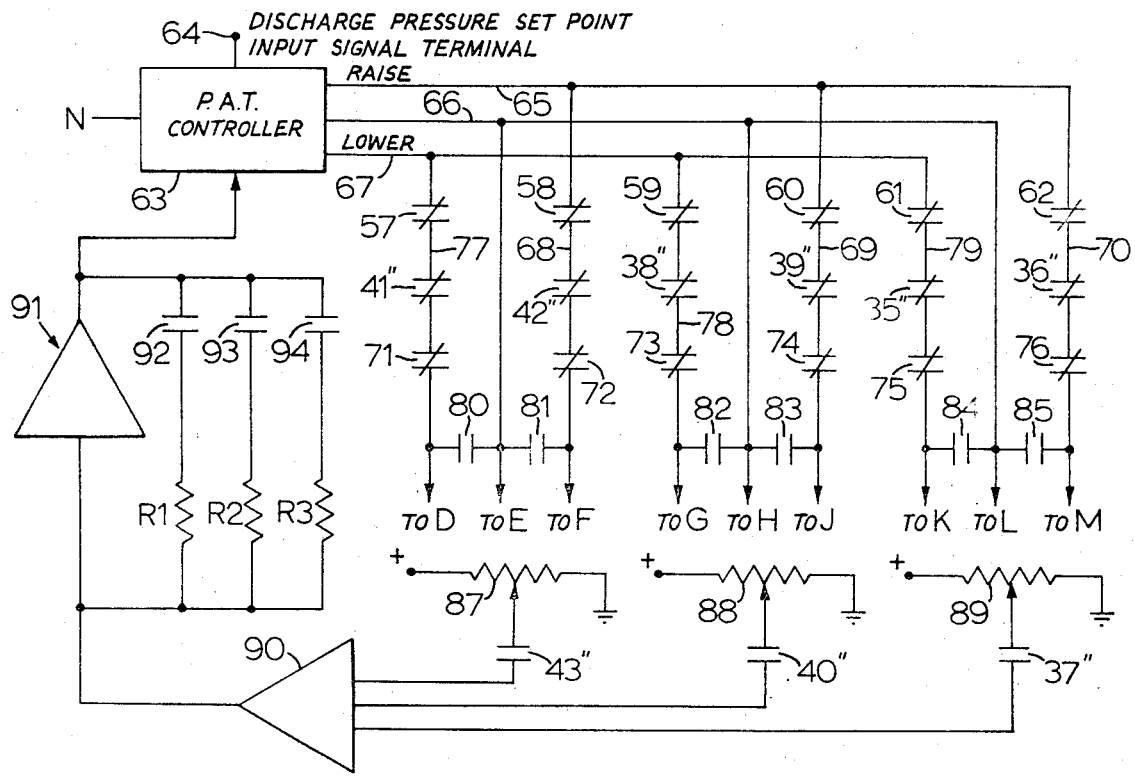
Figure 2:
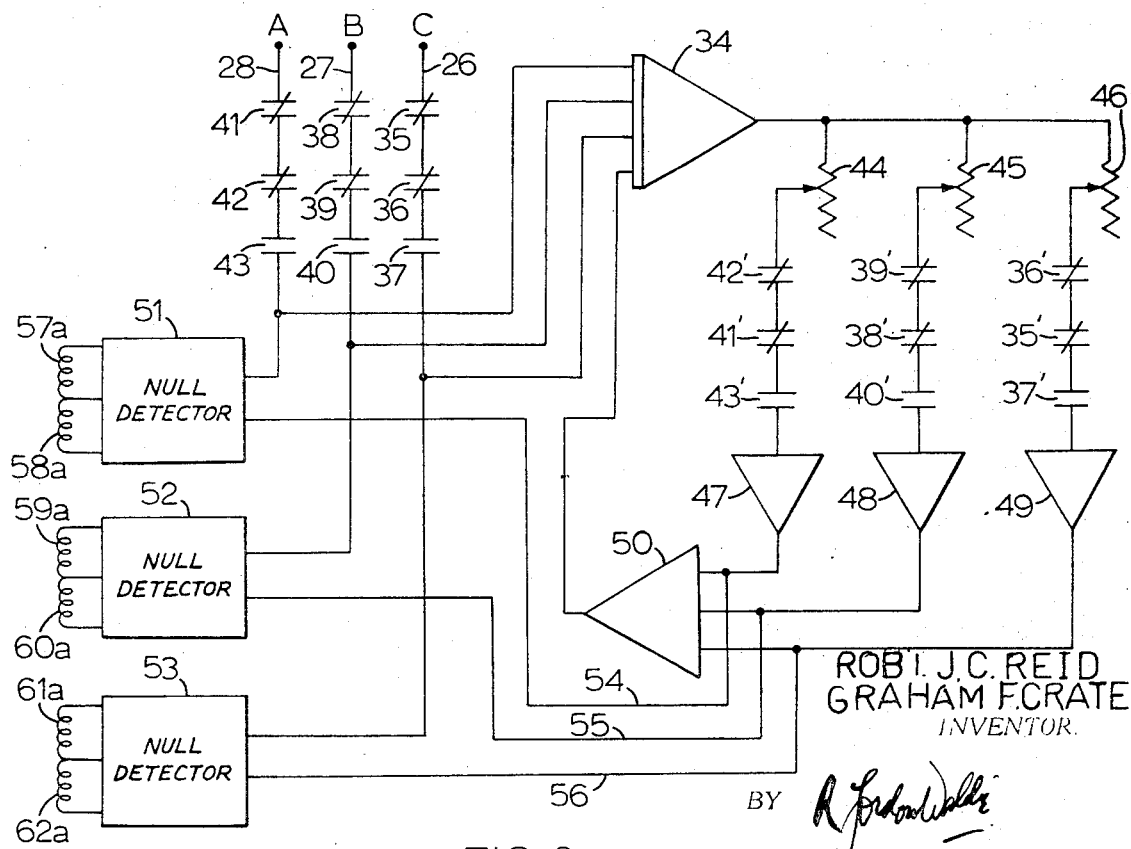

This invention will become more apparent from the following detailed description, taken in conjunction with the appended drawings, in which:

FIG. 1 is a schematic diagram of a compressor station of a natural gas transmission system; and FIG. 2 is a circuit diagram, partly in block form, of part of a control system embodying this invention, other components thereof being shown in FIG. 1.

Referring to FIG. 1, there are shown parts of three pipelines 10, 11, and 12 that are intended to operate in parallel and one compressor station 13 of a number of such stations along the pipelines. The pipelines may be for the transmission of natural gas, although this is not essential to the invention, and the direction of gas flow is indicated by the arrow 14.

In each pipeline there is located a main line valve 15. Suction tieover valves 16 are connected between the pipelines on the suction end of the compressor station, while discharge tieover valves 17 are connected between the pipelines on the discharge end of the compressor station.

Compressor station 13 includes three compressor plants, "A," "B," and "C" plants. Each plant is connected to its respective pipeline via a suction side valve 18 and a discharge side valve 19, the connection being on the suction and discharge sides respectively of main line valve 15.

Suction crossover valves 20 are connected between the suction sides of the plants, while discharge crossover valves 21 are connected between the discharge sides of the plants. Recycle lines each containing a valve 22 are provided.

Each compressor plant has a speed control system or setter, these being designated 23, 24, and 25 of "A," "B," and "C" plants respectively.

Electrical signals that are proportional to the actual flows in cu. ft./min. of "A," "B," and "C" plants are provided on conductors 26, 27 and 28 respectively, these signals being derived by devices 29, 30 and 31 respectively that measure the flows in the suction lines of the three plants.

These devices may be differential pressure transmitters measuring the pressure differential across an orifice plate in the suction line. A square root extractor following the transmitter generates an electrical signal proportional to the square root of the pressure differential, and this signal is proportional to the actual flow in the line. This is a well known method of flow measurement. If desired, the devices could be placed in the plant discharge lines, although temperature compensation then would add a complication.

The discharge pressure of compressor station 13 is measured by either of three devices 32, each of which provides an electrical signal on conductor 33 that is proportional to station discharge pressure. Devices 32 are known in the art and are referred to as pressure transducers. In practise only one of the three devices will be used at any time, but three are required in case one or two of the pipelines are shut down.

When the three pipelines are operating in parallel, valves 15 are closed, and valves 16, 17, 18 and 19 are open. Valves 20 and 21 could be open or closed but normally would be open. Valves 22 normally would be closed.

Referring now to FIG. 2, the control system shown therein includes an integrator 34 having four input signal terminals, three of which are connected to conductors 26, 27 and 28 respectively. The contacts 35, 36 and 37 of three relays are connected in series with each other in conductor 26, as are contacts 38, 39 and 40 in conductor 27 and contacts 41, 42 and 43 in conductor 28. Contacts 43, 40 and 37 are controlled manually and will be closed for parallel operation, but otherwise will be open. Thus, contacts 43 will be closed if A plant is in parallel with either of the other two plants, but if A plant is not operating, or is operating by itself, contacts 43 will be open. The output terminal of integrator 34 is connected to three potentiometers 44, 45 and 46 that constitute plant flow ratio setters for "A," "B" and "C" plants. The sliders of the potentiometers are connected to the input terminals of unitary gain, phase inverting amplifiers 47, 48 and 49. Relay contacts 42', 41', and 43' are connected in series circuit between the slider of potentiometer 44 and the input terminal of amplifier 47. Similarly, relay contacts 39', 38', and 40' and relay contacts 36', 35' and 37' are series connected in the two other parallel circuits between the sliders of potentiometers 45 and 46 and amplifiers 48 and 49.

It is to be understood herein that relay contacts designated by a reference numeral and a prime, double prime etc. operate in coincidence with contacts designated by that same reference numeral without any primes.

The output terminals of amplifiers 47–49 are connected to the three input terminals of a unitary gain, summing amplifier 50 that has its output terminal connected to the fourth input terminal of integrator 34. In addition, the output terminals of amplifiers 47–49 are connected to input terminals of null detectors or comparators 51, 52 and 53 respectively via conductors 54, 55 and 56 respectively. The other input terminals of null detectors 51–53 are connected to conductors 28, 27 and 26 respectively. The coils 57a, 58a, 59a, 60a, 61a and 62a of relays having contacts 57–62 respectively are connected to the output terminals of null detectors 51–53.

A position adjusting type controller 63 has three input and three output terminals. One input terminal is connected to one of conductors 33 and thus receives signals proportional to the actual discharge pressure of compressor station 13. Another input terminal 64 receives an electrical signal indicative of the desired discharge pressure of the compressor station, which signal may be generated by any suitable means and varied as desired.

The output terminals of controller 63 are connected to a "raise" or "increase" busbar 65, a neutral busbar 66 and a "lower" or "decrease" busbar 67. Neutral busbar 66 is connected to each of setters 23–25. "Raise" busbar 65 is connected to the three setters via conductors 68, 69 and 70 respectively in which are series connected the following relay contacts: 58, 42", and 72; 60, 39" and 74; 62, 36" and 76 respectively. "Lower" busbar 67 is connected to the same three setters via conductors 77, 78 and 79 respectively in which are series connected the following relay contacts: 57, 41" and 71; 59, 38" and 73; 61, 35" and 75 respectively.

Connected between neutral busbar 66 and contacts 71 and 72 are manually controlled contacts 80 and 81 that each are mechanically interlocked with both sets of contacts 71 and 72, so that if contacts 80 or 81 are closed, contacts 71 and 72 will be opened. This interlock feature isolates plant setter 23 from controller 63 and other setters 24 and 25 and eliminates any possibility of "raise" and "lower" signals being supplied to any setter at the same time. It is to be understood that the closing of contacts 80 or 81 completes a circuit for plant setter 23 that causes a decrease or an increase in the speed of operation of the turbine or other prime mover of the plant.

Contacts 82 and 83 each mechanically interlocked with contacts 73 and 74 similarly are connected between busbar 66 and contacts 73 and 74, and the "C" plant control system similarly is provided with contacts 84 and 85 each mechanically interlocked with contacts 75 and 76.

Three potentiometers 87, 88 and 89 connected across a suitable power supply (not shown) are connected via contacts 43", 40" and 37" respectively to the three input terminals of a unity gain, summing amplifier 90 whose output terminal is connected to the input terminal of a variable gain amplifier 91. The output terminal of amplifier 91 is connected to the third input terminal of controller 63. The gain of amplifier 91 is controlled by three circuits each including a resistor and the contacts of a relay, these being designated R1, R2 and R3 and 92, 93 and 94 respectively.

The operation of the control system now will be described.

The settings of potentiometers 44–46 determine the proportion of the total station flow to be taken by the three plants, i.e. the flow ratios. In practise the turbines or other prime movers driving the compressors of the three plants may have ratings of, say, 14,000, 14,000 and 19,000 horsepower, potentiometers 44–46 will have scales reading from 0–20,000 horsepower, and the operator will set the potentiometers at the rated horsepower of the turbines.

The signals on conductors 28, 27 and 26 indicate the actual plant flows of "A", "B" and "C" plants and are supplied to integrator 34 along with a signal from amplifier 50 that is the negative of the sum of the signals on conductors 26–28. The output signal of integrator 34 is applied to potentiometers 44–46 which, as aforementioned, determine by their settings the flow ratios of the compressor station. Thus, the signals on conductors 54–55 are proportional to the desired flows of the three plants. They also, when added, equal the sum of the signals on conductors 26–28 and are so added by summing amplifier 50.

It should be understood that in the control system above described the sum of the ratios set by potentiometers 44–46 may not be unity and, indeed, would not be unity with potentiometers scaled to 20,000 and set at 14,000, 14,000 and 19,000. It is for this reason that integrator 34 and summing amplifier 50 are employed. In a control system where the sum of the ratios adds to unity, integrator 34 could be replaced with a summing amplifier and summing amplifier 50 eliminated. In either case signals are obtained on conductors 54–56 that, for a given station flow, indicated the desired flows of the three plants, and those skilled in the art will appreciate that other components may be employed to achieve this same end without departing from this invention.

The signals on conductors 54–56 together with the signals on conductors 28, 27 and 26 indicating actual plant flows are applied to the input terminals of null detectors 51–53. The null detector for "A" plant operates as follows:

a. if actual "A" plant flow equals desired "A" plant flow, contacts 57 and 58 will remain closed, b. if actual "A" plant flow is greater than desired "A" plant flow, contacts 57 will remain closed, but coil 58a will be energized and contacts 58 will be opened.

c. if actual "A" plant flow is less than desired "A" plant flow contacts 58 will remain closed, but coil 57a will be energized and contacts 57 will be opened. It will be understood that the "B" and "C" plant null detectors operate in the same way opening and closing contacts 59, 60 and 61, 62 respectively.

It will be understood that controller 63 operates in a well-known manner to provide a signal on "raise" busbar 65 when the discharge pressure of the station is below setpoint and to provide a signal on "lower" busbar 67 when the station discharge pressure is above setpoint. The effect of the actual and desired "A" plant flows being equal is that "A" plant setter 23 will accept both raise and lower signals and vary the speed of "A" plant turbine accordingly. On the other hand, when actual "A" plant flow is greater than desired, contacts 57 are closed and contacts 58 are open, so "A" plant setter 23 will accept and act on only "lower" signals. Similarly, when "A" plant actual flow is less than desired, "A" plant setter 23 will accept only "raise" signals.

It should be apparent from the foregoing that two conditions are required to be met before setters 23-25, which may be motors driving speed control potentiometers, for example, will operate. These conditions are that there be a "raise" or "lower" signal present, and that relay contacts 59-62 be in a condition (closed) to accept the signal and pass it to the setters.

Relay contacts 41, 41' and 41'' are low speed or near surge limit contacts for "A" plant, just as relay contacts 38, 38', and 38'' and relay contacts 35, 35' and 35'' are low speed limit contacts for "B" and "C" plants. These contacts are opened automatically when the various plants reach their low speed limits and prevent "lower" signals from being applied to the setters. The opening of contacts 41 and 41' has the effect of removing "A" plant flow from the actual — desired flow ratio comparing circuit, just as the opening of contacts 38 and 38' and of contacts 35 and 35' has the effect of removing "B" and "C" plant flows from the actual - desired flow ratio comparing circuit.

Relay contacts 42, 42' and 42'' are high speed or horsepower limit contacts for "A" plant, just as relay contacts 39, 39' and 39'' and relay contacts 36, 36' and 36'' are high speed or horsepower limit contacts for "B" and "C" plants respectively. These contacts are opened automatically when the plants reach their high speed or horsepower limits, prevent "raise" signals from being applied to the affected plant setters, and remove the affected plant flows from the actual — desired flow ratio comparing circuit.

It should be noted that removal of the affected plant flows from the actual — desired flow ratio comparing circuit under the circumstances set out previously is of importance, as will be apparent from a consideration of the example where all plants are running at their desired flows and a general raise signal is given by controller 63. Under these circumstances, all of the turbines will speed up, and "A" plant, for example, will be assumed to reach a maximum horsepower limit. For safety reasons further "raise" signals now must be prevented from reaching "A" plant setter 23, and this is achieved by the opening of contacts 42''. However, if "A" plant flow is not removed also from the flow comparison circuit by the opening of contacts 42 and 42', the flow comparison circuit soon will indicate that "A" plant is taking less than its share of the load with "B" and "C" plants taking more than they should. Thus, while the "B" and "C" plants still may be capable of taking additional loads, relay contacts 60 and 62 will open preventing any "raise" signal from reaching setters 24 and 25, thereby limiting the total station output to less than actual capability.

Potentiometers 87-89 are driven by the motors that drive the "A," "B" and "C" plant speed control potentiometers and are part of a system that also includes amplifiers 90 and 91. This system supplies to the third input terminal of controller 63 a signal that indicates what change has taken place in response to a "raise" or "lower" signal and does so more quickly than discharge pressure transducer 32.

The purpose of resistors R1-R3 and contacts 92-94 is to change the gain of amplifier 91 dependent upon how many pipelines are connected in parallel with each other. With three lines connected in parallel, contacts 92-94 will be closed, and the gain of amplifier 91 may be unity, whereas with two lines in parallel, only two of the sets of contacts will be closed, and the gain may be 1.5, and with only one line operating, only one of the sets of contacts will be closed, and the gain may be 3. Thus, the gain of the feedback loop will increase as the number of lines operated in parallel decreases, meaning that the gain of the whole system will decrease, so that a smaller change of potentiometer 87, for example, will produce the same result as a greater change in a system with more pipelines in parallel. This change in gain compensates for changes in system dynamics when the number of pipelines being used changes and insures stable, fast acting control.

It will be seen from the foregoing that, in accordance with this invention, for a given station flow signals indicative of the actual and desired plant flows are derived and compared and the output signal of the comparing device is used in one of the following three ways: (a) to permit both "raise" and "lower" signals to be applied to the compressor plant, (b) to permit only "raise" signals to be so applied and (c) to permit only "lower" signals to be applied.

What we claim as our invention is:

1. Control apparatus for controlling the operation of a compressor station comprising at least two compressor plants connected to operate in parallel, said control apparatus comprising: means providing "raise" and "lower" signals responsive to the discharge pressure of said station being lower and higher respectively than a desired discharge pressure; means providing for the compressor plants a plurality of control signals responsive to differences between the actual and desired flow ratios between said compressor plants; control means for each of said compressor plants for controlling each of said compressor plants to raise of lower said discharge pressure of said station; means for supplying said "raise" and "lower" signals to said control means to raise or lower respectively said discharge pressure; and means responsive to said control signals for gating said supplying means on or off to permit supplying of or block delivery of said "raise" and "lower" signals to said control means.

2. Control apparatus for controlling the operation of a compressor station comprising at least two compressor plants connected to operate in parallel, said control apparatus comprising: means providing a first signal proportional to the gas discharge pressure of said station; means providing a second signal indicative of the desired gas discharge pressure of said station; means for comparing said first and second signals and providing "raise" and "lower" signals responsive to said first signal being less and greater respectively than said second signal; means providing third signals proportional to the actual flows of each said compressor plants; means providing fourth signals proportional to the desired flows of each of said compressor plants for a given compressor station flow; means for comparing said third and fourth signals for each compressor plant and providing for each compressor plant control signals responsive to differences between said third and fourth signals; speed control means for individually controlling the speeds of said compressor plants; means for supplying said "raise" and "lower" signals to said speed control means to vary the speeds of said compressor plants accordingly; and means for utilizing said control signals to permit supplying of or block delivery of said "raise" and "lower" signals to said speed control means.

3. Apparatus according to claim 2 wherein said means providing said fourth signals include means for varying the ratios of the station flow desired to be taken by said compressor plants.

4. Apparatus according to claim 2 wherein said means providing said fourth signals include an integrator having a plurality of input terminals and an output terminal, means connecting a plurality of potentiometers equal in number to the number of said compressor plants in parallel with each other and to said output terminal, means for adding the signals derived across said potentiometers and providing a fifth signal equal to the negative of the sum of said third signals, and means for supplying said third signals and said fifth signal to said input terminals of said integrator, said fourth signals being derived across said potentiometers.

5. Apparatus according to claim 2 including means responsive to any one of said compressor plants reaching a low limit for blocking deliver of "lower" signals to said speed control means of such compressor plant.

6. Apparatus according to claim 2 including means responsive to any one of said compressor plants reaching a high limit for blocking delivery of "raise" signals to said speed control means of such compressor plant.

7. Apparatus according to claim 2 including means responsive to any one of said compressor plants reaching a low or high limit for blocking delivery of "lower" and "raise" signals respectively to said speed control means of such plant and for rendering said third and fourth signal for such plant ineffective.

8. Apparatus according to claim 2 wherein said comparing means are null detectors.

9. Apparatus according to claim 4 including means responsive to any one of said compressor plants reaching a low or high limit for blocking delivery of "lower" and "raise" signals respectively to said speed control means of such plant and for discontinuing the supply of said third signal of such plant to said integrator and for opening the circuit including said potentiometer that determines the flow ratio for such plant.

* * * * *